United States Patent [19]

Seko et al.

[11] Patent Number: 4,496,938
[45] Date of Patent: Jan. 29, 1985

[54] DROWSINESS ALARM SYSTEM FOR A VEHICLE

[75] Inventors: Yasutoshi Seko, Yokohama; Takayuki Yanagishima; Masami Inoue, both of Yokosuka, all of Japan

[73] Assignee: Nissan Motor Company, Limited, Japan

[21] Appl. No.: 326,392

[22] Filed: Dec. 1, 1981

[30] Foreign Application Priority Data

Jun. 13, 1979 [JP] Japan .................................. 54-74189

[51] Int. Cl.³ ............................................. G02B 21/00
[52] U.S. Cl. .................................... 340/576; 340/575; 180/272
[58] Field of Search .................... 340/575, 576, 52 R, 340/52 D, 53; 180/272; 128/719

[56] References Cited

U.S. PATENT DOCUMENTS

| | | |
|---|---|---|
| 3,106,981 | 10/1963 | Chakiris . |
| 3,227,998 | 1/1966 | Platt .................. 340/576 |
| 3,654,599 | 4/1972 | Sepper ................ 340/576 |
| 3,794,969 | 2/1974 | Klopfenstein et al. . |
| 3,877,541 | 4/1975 | Takeuchi et al. . |
| 3,938,612 | 2/1976 | Boudeville et al. . |
| 3,980,999 | 9/1976 | Nishioka .............. 180/272 |
| 4,005,398 | 1/1977 | Inoue et al. . |
| 4,007,357 | 2/1977 | Yanagishima et al. . |
| 4,017,843 | 4/1977 | Yanagishima . |
| 4,031,527 | 6/1977 | Yanagishima et al. . |
| 4,058,796 | 11/1977 | Oishi et al. . |
| 4,104,621 | 8/1978 | Yanagishima et al. . |
| 4,278,969 | 7/1981 | Woods . |

FOREIGN PATENT DOCUMENTS

2042853 8/1970 Fed. Rep. of Germany .
54-65428 12/1980 Japan .................................. 340/576

Primary Examiner—Glen R. Swann, III
Attorney, Agent, or Firm—Lowe, King, Price & Becker

[57] ABSTRACT

A drowsiness alarm system for a vehicle detects the driver's increasing state of drowsiness on a basis of abnormal steering change repetitions for a fixed period of time in a monotonous driving state defined, for example, as the gear shift lever being placed at an overdrive or top position. The alarm system produces an alarm to the driver to prevent the driver from increasing the state of drowsiness. The drowsiness alarm system according to the present invention comprises: (a) a steering signal generator which generates a signal corresponding to the change of an angle through which the steering wheel is rotated; (b) a monotonous driving-state detector which detects and signals that the vehicle is traveling in a monotonous driving state; (c) a discriminator which compares the change of steering signal level from said steering signal generator for a fixed period of time with a reference value; and (d) an alarm pulse generator which outputs an alarm pulse into an alarm circuit producing an alarm in response to the input alarm pulse when the output signal from the discriminator indicating the change of steering signal for the fixed period of time exceed the reference voltage.

10 Claims, 6 Drawing Figures

DROWSINESS ALARM SYSTEM FOR A VEHICLE

BACKGROUND OF THE INVENTION

Field of the Invention

The present invention relates to a drowsiness alarm system for a vehicle which detects the degree of drowsiness of a driver on the basis of abnormal changes in the rate of steering repetitions during a high speed, monotonous driving state.

SUMMARY OF THE INVENTION

It is a primary object of the present invention to provide a drowsiness alarm system for a vehicle which produces an alarm to the vehicle driver upon detection of the driver's increasing state of drowsiness on the basis of a rate of steering changes which occurs in a steady-state driving condition where the driver may easily become drowsy from monotony as distinguished from other driving states, e.g., acceleration driving. This is achieved by the drowsiness alarm system comprising: (a) a steady-state or monotonous traveling-state detector which detects the existence of a monotonous traveling state for a vehicle; (b) a steering signal generator which produces a steering signal according to an angle of change of steering for a maneuver executed by the vehicle driver; (c) a discriminator which receives the steering signal from the steering signal generator and discriminates whether, within a predetermined interval of time from the time when the level of the steering signal exceeds the first predetermined level, a level of the steering signal occurs which exceeds a first predetermined level and whether the level of the steering signal also exceeds a second predetermined level, the discriminator outputting a signal when a steering operation as described above occurs a predetermined number of times within a predetermined period of time; and (d) a circuit which produces an alarm signal in response to the output signal from the discriminator during the detection of the monotonous driving-state by the monotonous driving-state detector.

BRIEF DESCRIPTION OF THE DRAWINGS

The features and advantages of the present invention will be clearly appreciated from the foregoing description and drawings in which the same reference numerals designate the corresponding elements and in which.

DESCRIPTION OF THE PREFERRED EMBODIMENTS

Reference will be made to the drawings and first to FIG. 1 which indicates a circuit block diagram of a first preferred embodiment.

Figure 1:
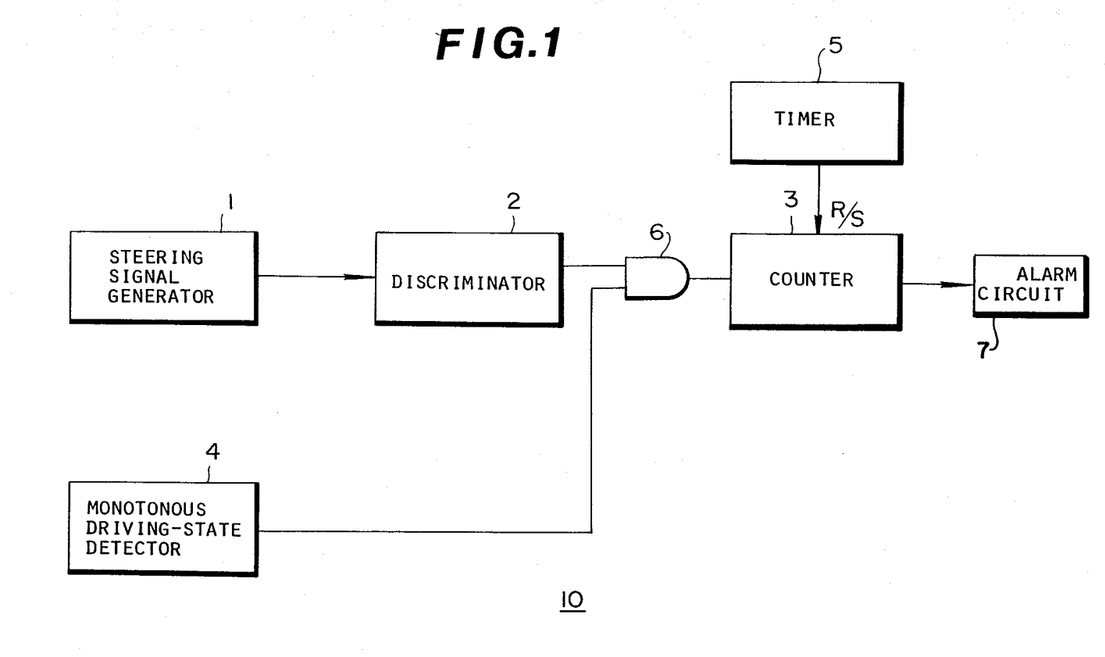
FIG. 1 is a simplified circuit block diagram showing a first preferred embodiment of a drowsiness alarm system for a vehicle according to the present invention.

In FIG. 1, the drowsiness alarm system 10 having an alarm circuit (not shown in detail and exemplified by U.S. Pat. No. 3,980,999, the disclosure of which is incorporated herein by reference) which provides an alarm to a vehicle driver in response to an alarm pulse fed thereto comprises: (a) a steering signal generator 1 (similarly exemplified by U.S. Pat. No. 3,980,999) which generates a steering signal whose voltage level depends on an angle with respect to an equilibrium position through which the steering wheel is rotated; (b) a discriminator 2 which compares the level of the steering signal with a predetermined voltage level and produces a pulse whenever the level of the steering signal reaches the predetermined voltage level; (c) a counter 3 which counts the output pulse from the discriminator 2; and (d) a monotonous driving-state detector 4 (exemplified by Japanese Patent Application Publication No. 55-156725(a)) which detects and signals that the vehicle is traveling in a monotonous state to the counter 3 via an AND gate 6 so that the counter 3 counts the output pulse from the counter 3 in synchronization with an output pulse fed from a timer 5 at a certain interval and outputs the alarm pulse to the alarm circuit when the counted value reaches a predetermined number. A structure useful for detecting monotonous driving conditions is illustrated in commonly assigned co-pending application Ser. No. 304,254, filed by Yasutoshi Seko et al. on Sept. 21, 1981, for a drowsiness alarm system for a vehicle, and incorporated herein by reference.

In the construction described above, the monotonous driving-state detector 4 detects the monotonous driving-state of the vehicle, e.g., depending on whether a gear selector switch is shifted into the high gear or overdrive gear position for a certain interval of time or whether the vehicle travels at a speed more than a predetermined value for a predetermined period of time. The counter 3 receives the output pulse from the discriminator 2 via the AND gate 6 when the detection signal from the monotonous driving-state detector 4 is active and outputs an alarm signal to an alarm circuit 7 provided at the subsequent stage whenever the counted value reaches a predetermined value for an interval set by the timer 5.

Figure 3:
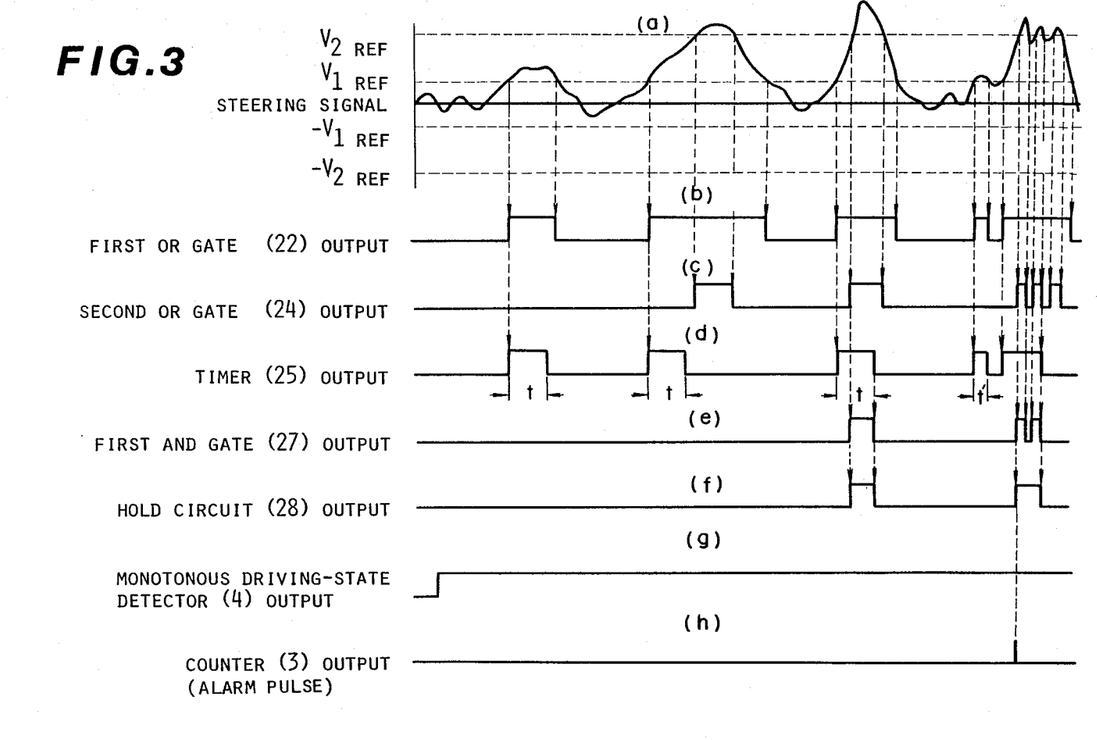
FIG. 3 is a signal timing chart of the circuit shown in FIG. 2.
Figure 5:
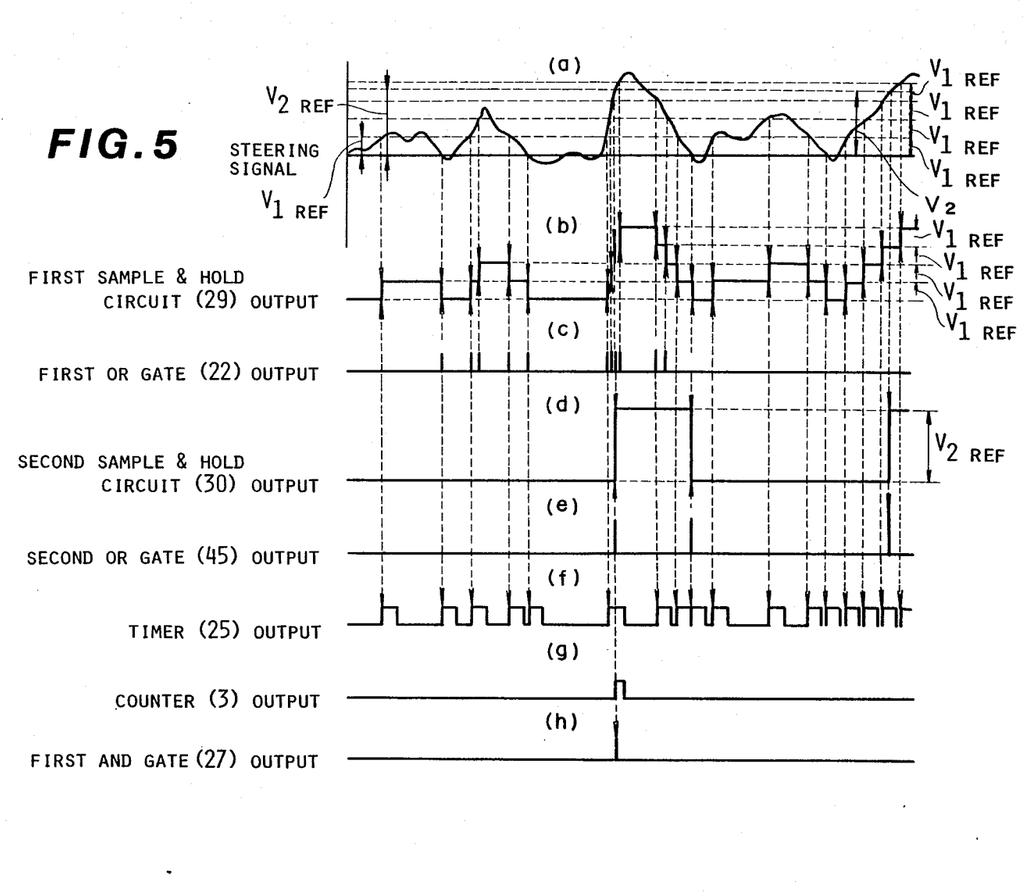
FIG. 5 is a signal timing chart of the circuit shown in FIG. 4.

The steering signal generator 1 can provide a steering signal as shown by (a) of FIG. 3 and (a) of FIG. 5, e.g., by detecting a steering angle, steering force, yawing, transverse acceleration, oil pressure at a power steering mechanism, etc.

Figure 2:
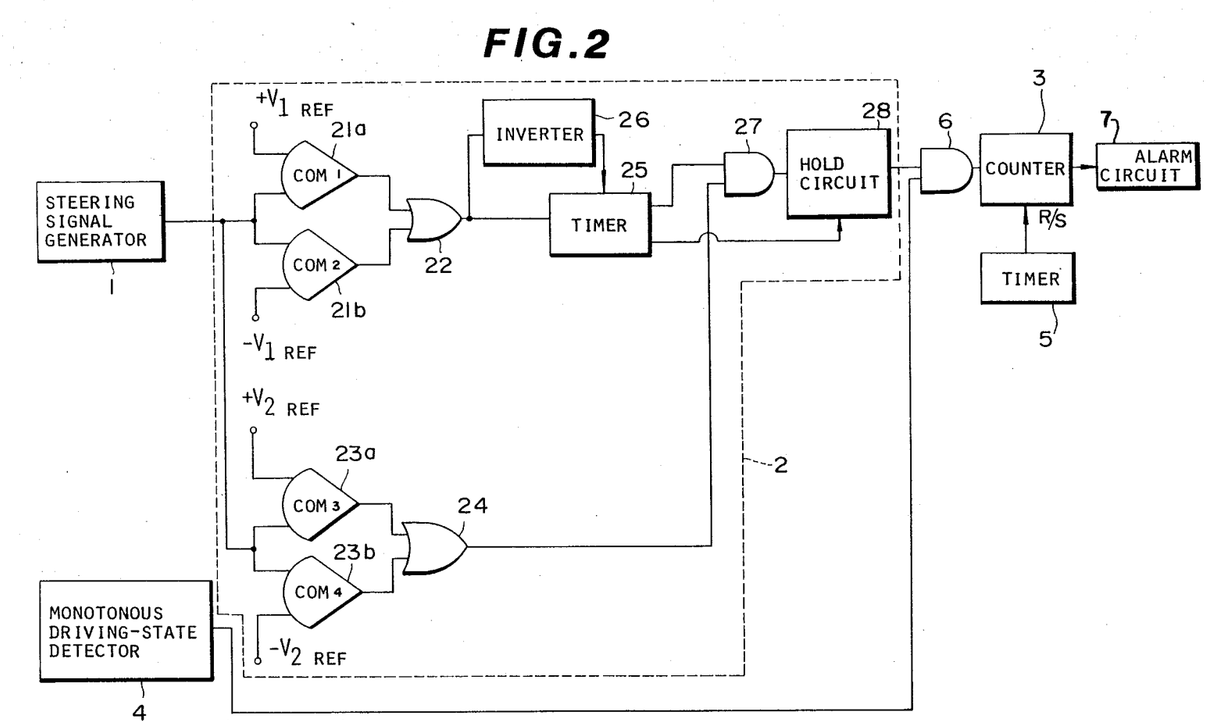
FIG. 2 is a circuit block diagram showing the first preferred embodiment in more detail than shown by FIG. 1.

FIG. 2 shows a circuit block diagram of the first preferred embodiment describing the circuit in more detail than shown by FIG. 1.

In FIG. 2, the discriminator 2 comprises first and second comparators 21a and 21b, a first OR gate 22, an inverting amplifier 26, a timer 25, a first AND gate 27, a hold circuit 28, third and fourth comparators 23a and 23b, and a second OR gate 24.

One of the two input terminals of the first comparator 21a is connected to the steering signal generator 1 together with one of the two input terminals of the second comparator 21b. The other input terminal of the first comparator 21a is connected to a positive first reference voltage $+V_{1REF}$. The other input terminal of the second comparator 21b is connected to a negative first reference voltage $-V_{1REF}$. The output terminals of the first and second comparators 21a and 21b are connected to the first OR gate 22. The output terminal of the first OR gate 22 is connected to the inverting amplifier 26 and timer 25. One of the two input terminals of the third comparator 23a is connected to the steering signal generator 1 together with one of the two input terminals of the fourth comparator 23b. The other input terminal of the third comparator 23a is connected to a positive second reference voltage $+V_{2REF}$. The other input terminal of the second comparator 23b is connected to a negative second reference voltage $-V_{2REF}$. The output terminals of the third and fourth comparators 23a and 23b are connected to the second OR gate 24. One of the output terminals of the timer 25 is connected to the first AND gate 27 and the other to the hold circuit 28. The output terminal of the second OR gate 24 is connected to the first AND gate 27. The first AND gate 27 is connected to the hold circuit 28. The hold circuit 28 is connected to the counter 3. The counting timing of the counter 3 is determined by the timer 5, i.e., the counter 3 is set or reset by an output pulse from the timer 5 at a predetermined interval.

In the construction described above, the operation of the drowsiness alarm system is described with reference to FIG. 3. When the steering signal generator 1 outputs a steering signal, e.g., as shown in FIG. 3(a), each of the compared results is outputted from the first and second OR gates 22 and 24 after comparing the level of the steering signal with the positive and negative first reference voltages $+V_{1REF}$ and $-V_{1REF}$ and with the positive and negative second reference voltages $+V_{2REF}$ and $-V_{2REF}$ as shown in (b) and (c) of FIG. 3. Simultaneously when the first OR gate 22 outputs a high-level voltage signal, the timer 25 turns on (outputs a high-level voltage signal) for a certain interval of time t. However, when the first OR gate 22 outputs a low-level voltage signal (turns off) before the interval of time t has passed, the high-level output voltage signal of the first inverter 26 causes the timer 25 to turn off (outputs a low-level voltage signal) after another certain interval of time t′ has passed as shown in (d) of FIG. 3. When both second gate 24 and timer 25 output a high-level voltage signal at the same time, the first AND gate 27 outputs a high-level voltage signal as shown in (e) of FIG. 3. The high-level voltage signal outputted from the first AND gate 27 causes the hold circuit 28 to hold its state for a predetermined period of time as shown in (f) of FIG. 3. On the other hand, when the vehicle is in the monotonous driving-state, the monotonous driving-state detector 4 turns on (outputs a high-level voltage signal) as shown in (g) of FIG. 3. The counter 3, thereafter, receives the output signal from the hold circuit 28 in response to the high-level voltage signal from the monotonous driving-state detector 4 as shown in FIG. 2. The counter 3, thereafter, counts the number of the pulses generated from the hold circuit 28 and, as shown in (h) of FIG. 3, outputs an alarm signal whenever the number of the pulses reaches a predetermined number for a predetermined period of time by means of the timer 5.

Figure 4:
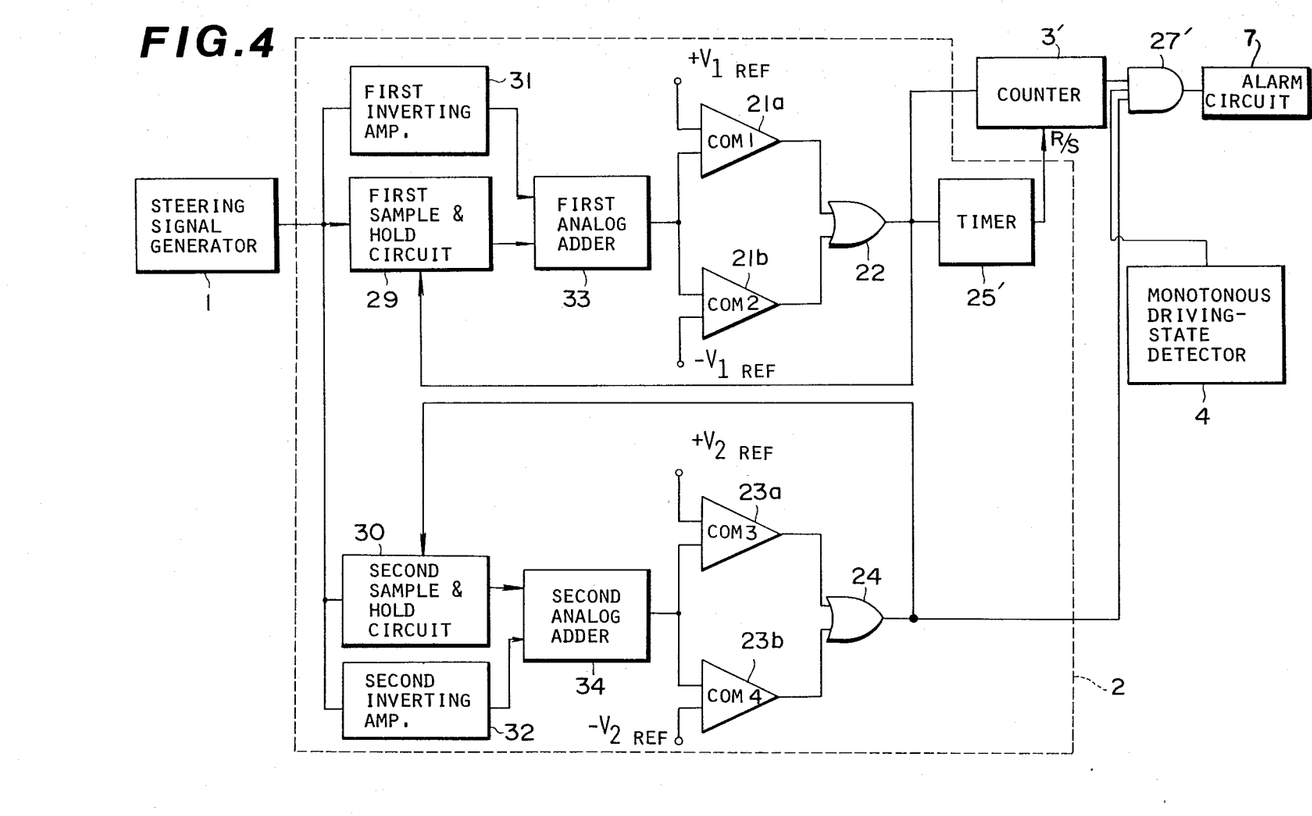
FIG. 4 is a circuit block diagram showing a second preferred embodiment according to the present invention.

FIG. 4 shows another drowsiness alarm system of a second preferred embodiment according to the present invention.

In FIG. 4, the drowsiness alarm system comprises: (a) a steering signal generator 1; (b) a first sample and hold circuit 29 connected to the steering signal generator 1; (c) a second sample and hold circuit 30 connected to the steering signal generator 1; (d) a first analog adder 33 connected to the first sample and hold circuit 29; (e) a second analog adder 34 connected to the second sample and hold circuit 30; (f) a first inverting amplifier 31 connected between the steering signal generator 1 and first analog adder 33; (g) a second inverting amplifier 32 connected between the steering signal generator 1 and second analog adder 34; (h) a first comparator 21a connected to the first analog adder 33 and to the positive first reference voltage $+V_{1REF}$; (i) a second comparator 21b connected to the first analog adder 33 and to the negative first reference voltage $-V_{1REF}$; (j) a third comparator 23a connected to the second analog adder 34 and to the positive second reference voltage $+V_{2REF}$; (k) a fourth comparator 23b connected to the second adder 34 and to the negative second reference voltage $-V_{2REF}$; (l) a first OR gate 22 connected to the first comparator 21a and to the second comparator 21b; (m) a second OR gate 24 connected to the third comparator 23a and to fourth comparator 23b; (n) a timer 25′ connected to the first OR gate 22; (o) a counter 3′ connected to the first OR gate 22; and (p) a first AND gate 27′ connected to the counter 3′, to the second OR gate 24 and to the monotonous driving-state detector 4. The output terminal of the first OR gate 22 is connected to a sample switching terminal of the first sample and hold circuit 29 and the output terminal of the second OR gate 24 is connected to a sample switching terminal of the second sample and hold circuit 30. Since the subsequent stage of the first AND gate 27 is the same as that subsequent to the counter 3 shown in FIG. 2, the description is omitted hereinafter.

In the construction described above, the operation is described hereinafter with reference to FIG. 5. When the steering signal generator 1 outputs a steering signal waveform such as shown in (a) of FIG. 5, the first inverting amplifier 31 outputs an inverted voltage signal of the steering signal since the first inverting amplifier 31 has an amplification gain of −1. When the steering signal from the steering signal generator 1 increases to the first reference voltage $V_{1REF}$ level from zero voltage, the first inverting amplifier 31 outputs a negative first reference voltage $-V_{1REF}$ level at this time and the first analog adder 33 outputs the negative first reference voltage $-V_{1REF}$ since the first sample and hold circuit 29 outputs no voltage.

At this time, the second comparator 21b outputs a high-level voltage signal and then the first OR gate 22 outputs the high-level voltage signal from the second comparator 21b. At the instant when the first OR gate 22 outputs the high-level voltage signal, the first sample and hold circuit 29 receives the high-level voltage signal from the first OR gate 22 at the sample switching terminal thereof and, e.g., the analog switch provided within the first sample and hold circuit 29 is turned on to enable the voltage of the steering signal generator 1 to pass therethrough and apply across the capacitor within the first sample and hold circuit 29 so that the positive first reference voltage $V_{1REF}$ is held at the capacitor of the first sample and hold circuit 29. When the steering signal from the steering signal generator 1 decreases from the positive first reference voltage $+V_{1REF}$ and reaches to zero voltage as shown in (a) of FIG. 5, the first analog adder 33 outputs the positive first reference voltage $+V_{1REF}$ since the first sample and hold circuit 29 holds the voltage equal to the plus first reference voltage $+V_{1REF}$ and the first inverting amplifier 31 outputs zero voltage. The first comparator 21a then outputs a high-level voltage signal and the first OR gate 22 feeds the high-level voltage signal back to the sample switching terminal of the first sample and hold circuit 29 so that the first sample and hold circuit 29 holds the output of the steering signal generator 1, i.e., zero voltage as shown in (b) of FIG. 5. When the steering signal from the steering signal generator 1 increases and reaches a positive second reference voltage $+V_{2REF}$ as shown in (a) of FIG. 5, the second inverting amplifier 32 outputs a negative second reference voltage signal $-V_{2REF}$ so that the second analog adder 34 outputs the negative second reference voltage $-V_{2REF}$ since the second sample and hold circuit 30 outputs no voltage and then the fourth comparator 23b outputs a high-level voltage signal. At the instant when the second OR gate 24 goes high since the second OR gate 24 receives the high-level voltage signal from the fourth comparator 23b, the second sample and hold circuit 30 holds the voltage equal to the positive second reference voltage $+F_{2REF}$ from the steering signal generator 1. When the steering signal of the steering signal generator 1 decreases from the voltage equal to the positive second reference voltage $+V_{2REF}$ and reaches zero voltage as shown in (a) of FIG. 5, the second analog adder 34 outputs the positive second reference voltage $+V_{2REF}$ since the second inverting amplifier 32 outputs zero voltage so that the third comparator 23a outputs a high-level voltage signal and then the second sample and hold circuit 30 holds zero voltage in response to the rising edge of the signal from the second OR gate 24. In this way, the first and second OR gates 22 and 24 output respective pulses whenever the steering signal decreases or increases by a range of the respective reference voltages $V_{1REF}$ or $V_{2REF}$. Whenever the first OR gate 22 outputs a pulse, the timer 25' turns on (outputs a high-level voltage) for a predetermined period of time in response to the pulse from the first OR gate 22 as shown in (f) of FIG. 5. During the predertermined period of time by the timer 25', the counter 3' counts the number of pulses fed from the first OR gate 22 and outputs a high-level voltage signal as shown in (g) of FIG. 5 when the number of counted pulses reaches a predetermined number. The first AND gate 27' outputs a pulse fed from the second OR gate 24 only when the high-level voltage signal from the counter 3' is received as shown in (h) of FIG. 5.

The output pulse from the first gate 27' is fed into the alarm circuit (not shown) together with the output signal from the monotonous driving-stage detector 4, thus the alarm circuit producing an alarm in a predetermined form, e.g., buzzer sound or display to prevent the vehicle driver from further increasing state of drowsiness.

Figure 6:
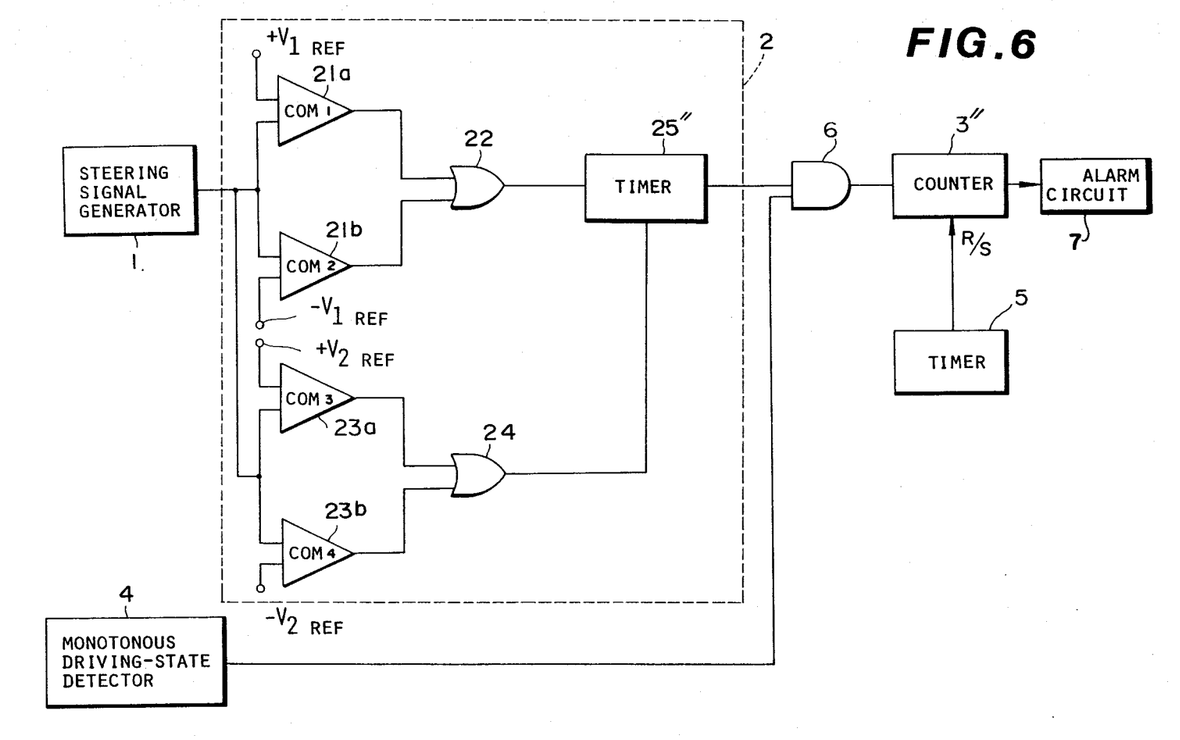
FIG. 6 is a circuit block diagram showing a third preferred embodiment according to the present invention.

FIG. 6 shows a third preferred embodiment of the drowsiness alarm system according to the present invention.

The drowsiness alarm as shown in FIG. 6 comprises: (a) the steering signal generator 1; (b) the first comparator 21a having the negative first reference voltage $-V_{1REF}$ supply; (c) the second comparator 21b having the positive first reference voltage $+V_{1REF}$ supply; (c) the first OR gate 22; (d) the third comparator 23a having the positive second reference voltage $+V_{2REF}$ supply; (e) the fourth comparator 23b having the negative second reference voltage $-V_{2REF}$ supply; (f) the timer 25''; (g) the monotonous driving-state detector 4; (h) counter 3''; (i) an AND gate 6; and (j) timer 5. The output of the counter 3'' is connected to the alarm circuit 7 in the same way as described in both first and second preferred embodiments. The steering signal generator 1 is connected to both first and second comparators 21a and 21b and third and fourth comparators 23a and 23b. The first OR gate 22 is connected to the first and second comparators 21a and 21b. The second OR gate 24 is connected to the third and fourth comparators 23a and 23b. The timer 25'' is connected to the first OR gate 22 and at the reset terminal of which is connected to the second OR gate 24. The counter 3'' is connected to the timer 25'' and at the set/reset terminal thereof is connected to the timer 5 to receive a pulse therefrom identifying a counting interval.

In this construction, the timer 25'' turns on (outputs a high-level voltage signal) in response to the output signal from the first OR gate 22 for a predetermined period of time within the time of which the output signal from the second OR gate 24 is received so that the timer 25'' is reset to produce a pulse signal. The counter 3'' counts the number of the pulse signals received from the timer 25'' via the AND gate 6 when the monotonous driving-state detector 4 outputs the high-level voltage signal and outputs a pulse whenever the number of counted pulses reaches a predetermined number for a predetermined period of time due to the other timer 5.

According to the present invention as described hereinbefore, the drowsiness alarm system judges the driver to be getting drowsy when the rate of change of the steering for a predetermined period of time exceeds a predetermined value during the monotonous driving-state. Consequently, the state of the drowsiness of the driver can accurately be detected and the alarm for the state can steadily be produced.

The foregoing relates to preferred exemplary embodiments of the present invention, it being understood that variants thereof are possible within the spirit and scope of the present invention, the latter being defined by the appended claims.

What is claimed is:

1. A drowsiness alarm system for a vehicle having an alarm circuit which produces an alarm for a driver in response to a pulse signal inputted thereto, comprising:
   (a) a steering signal generator which outputs a steering signal having a voltage level representative of an angular position of a steering wheel with respect to an equilibrium point thereof;
   (b) a monotonous driving-state detector which detects and signals that the vehicle is traveling in a monotonous driving state;
   (c) a discriminator, connected to said steering signal generator, for comparing the voltage level of the steering signal fed from said steering signal generator with a first predetermined reference voltage level ($V_{1REF}$), and with a second predetermined reference voltage level ($V_{2REF}$), and for outputting a pulse signal when the voltage level of the steering signal exceeds the second predetermined reference voltage level within a first predetermined period of time from the time when the steering voltage level exceeds the first predetermined reference voltage level; and
   (d) an alarm pulse output circuit responsive to the output pulse signal from said discriminator and the detection signal from said monotonous driving-state detector, which provides an alarm pulse to the alarm circuit when the number of pulse signals fed from said discriminator exceeds a predetermined number within a second predetermined period of time.

2. A drowsiness alarm system for a vehicle having an alarm circuit which produces an alarm for a driver in response to a pulse signal inputted thereto, comprising:

(a) a steering signal generator which outputs a steering signal having a voltage level representative of an angular position of a steering wheel with respect to an equilibrium point thereof;

(b) a monotonous driving-state detector which detects and signals that the vehicle is traveling in a monotonous driving state;

(c) a discriminator means, connected to said steering signal generator, for comparing with reference value a change of steering signal voltage level during a predetermined period of time to produce an output pulse signal when the change of steering signal voltage level for the predetermined period of time exceeds the reference value;

said discriminator comprising:

a first comparator, one of two input terminals thereof being connected to said steering signal generator and the other input terminal to a positive supply of a first reference voltage level, which compares the voltage level of the steering signal from said steering signal generator with the positive first reference voltage level and outputs a voltage signal whenever the voltage level of the steering signal exceeds positively the positive first reference voltage level;

a second comparator, one of two input terminals thereof being connected to said steering signal generator and the other input terminal to a negative supply of said first reference voltage level, which compares the voltage level of the steering signal from said steering signal generator with the negative first reference voltage level and outputs a voltage signal whenever the voltage level of the steering signal exceeds negatively the negative first reference voltage level;

a third comparator, one of two input terminals thereof being connected to said steering signal generator and the other input terminal to a positive supply of a second reference voltage level, which compares the voltage level of the steering signal from said steering signal generator with the positive second reference voltage level and outputs a voltage signal whenever the voltage level of the steering signal exceeds positively the positive second reference voltage level;

a fourth comparator, one of two input terminals thereof being connected to said steering signal generator and the other input terminal to a negative supply of said second reference voltage level, which compares the voltage level of the steering signal from said steering signal generator with the negative second reference voltage level and outputs a voltage signal whenever the voltage level of the steering signal exceeds negatively the negative second reference voltage level;

a first OR gate, connected at its inputs to both output terminals of said first and second comparators;

an inverter, connected to the output of said first voltage signal when no voltage signal is received from said first OR gate;

a timer, connected to said first OR gate, which outputs a voltage signal for a first predetermined period of time in response to the voltage signal received from said first OR gate and connected to be reset by the voltage signal from said inverter when received during the first predetermined period of time;

an AND gate, one of two input terminals thereof being connected to said timer and the other input terminal to a second OR gate; and a hold circuit, connected to said AND gate, which holds the voltage signal fed from said AND gate, the voltage held therein being released in response to the voltage signal from said timer so as to generate the pulse signal from said discriminator and to provide said alarm pulse signal to said alarm pulse output circuit; and (d) an alarm pulse output circuit connected to provide an alarm pulse to the alarm circuit responsive to the output pulse signal from said discriminator means and to a detection signal from said monotonous driving-state detector.

3. A drowsiness alarm system for a vehicle having an alarm circuit which produces an alarm for a driver in response to a pulse signal inputted thereto, comprising:

(a) a steering signal generator which outputs a steering signal having a voltage level representative of an angular position of a steering wheel with respect to an equilibrium point thereof;

(b) a monotonous driving-state detector which detects and signals that the vehicle is traveling in a monotonous driving state;

(c) a discriminator, connected to said steering signal generator, for comparing the voltage level of the steering signal fed from said steering signal generator with a first predetermined reference voltage level ($V_{1REF}$), and with a second predetermined reference voltage level ($V_{2REF}$), and for outputting a pulse signal when the voltage level of the steering signal exceeds the second predetermined reference voltage level within a first predetermined period of time from the time when the steering voltage level exceeds the first predetermined reference voltage level;

and (d) an alarm pulse output circuit responsive to the output pulse signal from said discriminator and the detection signal from said monotonous driving-state detector, which provides an alarm pulse to the alarm circuit when the number of pulse signals fed from said discriminator exceeds a predetermined number within a second predetermined period of time;

said alarm pulse output circuit comprising:

a counter having an AND gate at an input terminal thereof which receives and counts the number of pulse signals from said discriminator when a detection signal is fed from said monotonous driving-state detector and which produces said alarm pulse whenever the number of counted pulse signals reaches a predetermined number and a timer, connected to said counter, which produces and outputs to said counter a pulse for a second predetermined period of time for setting and resetting said counter.

4. A drowsiness alarm system for a vehicle as set forth in claim 2, wherein said alarm pulse output circuit comprises a counter having an AND gate at an input terminal thereof, connected to said hold circuit, for counting the number of the pulse signals fed from said hold circuit when the detection signal from said monotonous driving-state detector is received at said AND gate and which produces said alarm pulse whenever the number of counted pulse signals reaches a predetermined number and a timer, connected to said counter, which produces and outputs to said counter a pulse for a second predetermined period of time for setting and resetting said counter.

5. A drowsiness alarm system for a vehicle having an alarm circuit which produces an alarm for a driver in response to a pulse signal inputted thereto, comprising:

(a) a steering signal generator which outputs a steering signal having a voltage level representative of an angular position of a steering wheel with respect to an equilibrium point thereof;

(b) a monotonous driving-state detector which detects and signals that the vehicle is traveling in a monotonous driving state;

(c) a discriminator, connected to said steering signal generator, for comparing the voltage level of the steering signal fed from said steering signal generator with a first predetermined reference voltage level ($V_{1REF}$), and with a second predetermined reference voltage level ($V_{2REF}$), and for outputting a pulse signal when the voltage level of the steering signal exceeds the second predetermined reference voltage level within a first predetermined period of time from the time when the steering voltage level exceeds the first predetermined reference voltage level;

said discriminator comprising:

a first inverting amplifier, connected to said steering signal generator, for inverting the polarity of the steering signal from said steering signal generator;

a first sample and hold circuit, connected to said steering signal generator, for holding a voltage level of the steering signal of said steering signal generator sampled at the instant when a first sample switching signal is received at a sample switching terminal thereof;

a first adder, connected to said first inverting amplifier and said first sample and hold circuit, which performs addition of the voltages from said first inverting amplifier and said first sample and hold circuit and provides an output voltage representing the results of said addition;

a first comparator, one of two input terminals thereof being connected to said first adder and the other input terminal to a positive supply of a first reference voltage level which compares the output voltage level of said first adder with the positive supply of a first reference voltage level and outputs a voltage signal whenever the output voltage level of said first adder increases and reaches the positive supply of a first reference voltage;

a second comparator, one of two input terminals thereof being connected to said first adder and the other input terminal to a negative supply of said first reference voltage level, which compares the voltage of said first adder with the negative supply of said first reference voltage level, which compares the output voltage of said first adder with the negative supply of said first reference voltage level and outputs a voltage signal whenever the voltage level of the steering signal first decreases and reaches the negative supply of said first reference voltage;

a second inverting amplifier, connected to said steering signal generator, for inverting the polarity of steering signal from said steering signal generator;

a second sample and hold circuit, connected to said steering signal generator, for holding a voltage level of the steering signal of said steering signal generator sampled at the instant when a second sample switching signal is received at a sample switching terminal thereof;

a second adder, connected to said second inverting amplifier and second sample and hold circuit, which performs addition of the output voltages of both said second inverting amplifier and second sample and hold circuit and provides an output voltage representing the results of said addition;

a third comparator, one of two input terminals thereof being connected to said second adder and the other input terminal to a positive supply of a second reference voltage level, which compares the output voltage level of said second adder with the positive supply of a second reference voltage level and outputs a voltage signal whenever the output voltage level of said second adder increases and reaches the positive supply of a second reference voltage;

a fourth comparator, one of two input terminals thereof being connected to said second adder and the other input terminal to a negative supply of said second reference voltage level, which compares the voltage of said second adder with the negative supply of said second reference voltage level, and outputs a output voltage signal whenever the output voltage level of said second adder decreases and reaches the negative supply of said second reference voltage;

a first OR gate, connected to said first and second comparators, an output signal thereof being fed into the sample switching terminal of said first sample and hold circuit for feeding therein said first sample switching signals;

a second OR gate, connected to said third and fourth comparators, the output signal thereof being fed into the sample switching terminal of said second sample and hold circuit for feeding therein as said second sample switching signal; and a timer, connected to said first OR gate, which produces a voltage signal for a predetermined period of time in response to the output signal of said first OR gate;

and (d) an alarm pulse output circuit responsive to the output pulse signal from said discriminator and the detection signal from said monotonous driving-state detector, which provides an alarm pulse to the alarm circuit when the number of pulse signals fed from said discriminator exceeds a predetermined number within a second predetermined period of time.

6. A drowsiness alarm system for a vehicle as set forth in claim 5, wherein said alarm pulse output circuit comprises:
   (a) a counter, connected to said first OR gate, for counting the number of the output signals of said first OR gate while the output signal of said timer is received at a reset terminal thereof and for outputting a voltage signal whenever the number of counted signals reaches a predetermined number; and
   (b) an AND gate, connected to said counter, to said second OR gate, and to said monotonous driving-state detector, for forming said alarm pulses as an ANDed combination of said counter, second OR gate, and monotonous driving-state detector signals and feeding the ANDed signal into the alarm circuit.

7. A drowsiness alarm system for a vehicle as set forth in claim 6, wherein the alarm circuit produces the alarm in response to the output signal outputted from said counter during the reception of the detection signal from said monotonous driving-state detector.

8. A drowsiness alarm system for a vehicle having an alarm circuit which produces an alarm for a driver in response to a pulse signal inputted thereto, comprising:
   (a) a steering signal generator which outputs a steering signal having a voltage level representative of an angular position of a steering wheel with respect to an equilibrium point thereof;
   (b) a monotonous driving-state detector which detects and signals that the vehicle is traveling in a monotonous driving state;
   (c) a discriminator, connected to said steering signal generator, for comparing the voltage level of the steering signal fed from said steering signal generator with a first predetermined reference voltage level ($V_{1REF}$), and with a second predetermined reference voltage level ($V_{2REF}$), and for outputting a pulse signal when the voltage level of the steering signal exceeds the second predetermined reference voltage level within a first predetermined period of time from the time when the steering voltage level exceeds the first predetermined reference voltage level;
   wherein said discriminator comprises:
     a first comparator, one of two input terminals thereof being connected to said steering signal generator and the other input terminal to a positive supply of a first reference voltage level, which compares the level of steering signal from said steering signal generator with the positive first reference voltage level and outputs a voltage signal whenever the voltage level of steering signal increases and reaches the positive first reference voltage level;
     a second comparator, one of two input terminals thereof being connected to said steering signal generator and the other input terminal to a negative supply of said first reference voltage level, which compares the voltage level of steering signal from said steering signal generator with the negative first reference voltage level and outputs a voltage signal whenever the voltage level of steering signal decreases and reaches the negative first reference voltage level;
     a third comparator, one of two input terminals thereof being connected to said steering signal generator and the other input terminal to a positive supply of a second reference voltage level, which compares the voltage level of steering signal from said steering signal generator with the positive second reference voltage level and outputs a voltage signal whenever the voltage level of steering signal increases and reaches the positive second reference voltage level;
     a fourth comparator, one of two input terminals thereof being connected to said steering signal generator and the other input terminal to a negative supply of said second reference voltage level, which compares the voltage level of steering signal from said steering signal generator with the negative second reference voltage level and outputs a voltage signal whenever the voltage level of steering signal decreases and reaches the negative second reference voltage level;
     a first OR gate, connected to said first and second comparators, which provides an output voltage signal representing a logical OR of the output voltage signals of said first and second comparators;
     a second OR gate, connected to said third and fourth comparators, which provides an output voltage signal representing a logical OR of the output voltage signals of said third and fourth comparators; and
     a timer, connected to said first OR gate, which is actuated for said first predetermined period of time in response to the output voltage signal from said first OR gate and is reset and provides the discriminator output pulse signal to said alarm pulse signal output circuit in response to the output voltage signal of said second OR gate during the first predetermined period of time; and
   (d) an alarm pulse output circuit which feeds an alarm pulse into the alarm circuit in response to the output pulse signal from said discriminator and the detection signal from said monotonous driving-state detector.

9. A drowsiness alarm system for a vehicle as set forth in claim 8, wherein said alarm pulse signal output circuit comprises:
   a counter having an AND gate at the input terminal thereof, connected to said timer, for counting the number of the pulse signals fed from said timer when the detection signal from said monotonous driving-state detector is received and which outputs the alarm pulse whenever the number of counted pulse signals reaches a predetermined number, and another timer, connected to said counter, which produces and outputs to said counter a pulse for a second predetermined period of time for setting and resetting said counter.

10. A drowsiness alarm system for a vehicle as set forth in any one of claims 2 or 4 through 9, wherein the absolute value of the positive and negative first reference voltage levels is lower than that of the positive and negative second reference voltage levels.

* * * * *